Feb. 18, 1958  C. W. KANDLE  2,823,900
VERTICAL REAMER
Filed Nov. 4, 1955
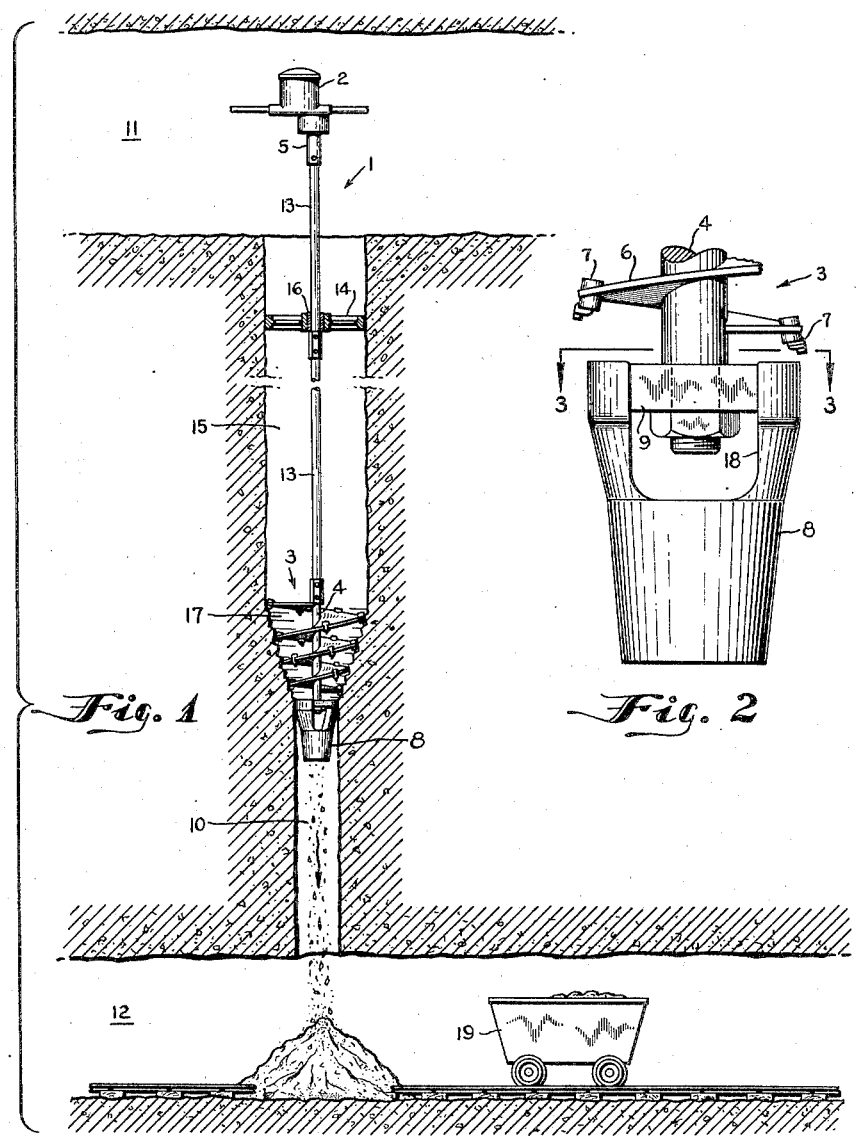
INVENTOR.
CHARLES W. KANDLE
BY
Andrus & Sceales
Attorneys United States Patent Office 2,823,900
Patented Feb. 18, 1958

2,823,900

VERTICAL REAMER

Charles William Kandle, Chicago, Ill.

Application November 4, 1955, Serial No. 545,066

5 Claims. (Cl. 255—73)

This invention relates to earth drills and particularly to a reamer for enlarging a vertical bore which is accessible at both ends.

The invention provides a guide to fit a given vertical bore and a rotatable drill head to advance downwardly and enlarge the bore while allowing the spoil to pass downwardly through the guide and the unenlarged portion of the bore for removal at the lower end thereof.

An object of the invention is to provide for more efficient vertical boring operations as between two tunnels of a mine where the space is limited and the assembly of large drill flights in a series is particularly difficult.

Another object is to assure that the spoil is always of a fineness that it will pass through the guide and the unenlarged portion of the bore and without clogging the same.

Another object is to eliminate the need of large and long drill flights in vertical boring operations where their use generally requires an overhead supporting rig.

The drawings furnished herewith illustrate the best mode of carrying out the invention as presently contemplated and set forth hereinafter.

In the drawings:

Figure 1 shows the entire drill operating to enlarge the vertical bore which extends from the floor of an upper tunnel to a lower tunnel where a car is shown for removing the spoil;

Fig. 2 is an enlarged side elevation of the lower end of the cutting head and of the drill head guide; and Fig. 3 is a section taken on line 3—3 of Fig. 2 and showing the guide in plan.

The drill 1 as shown in the drawings is driven by the motor 2 and includes the cutting head 3 which is similar to that described and claimed in the copending application of the present inventor, Serial No. 457,027 and filed on September 20, 1954, for Earth Boring Drills.

The cutting head 3 includes the shaft 4 which is adapted to be drivingly connected to the output shaft 5 of motor 2. The spiral screw-flight 6 is fitted with the series of cutters 7 which are spaced along the periphery of flight 6 so that each cutter of the series is of a given greater distance from shaft 4 than the preceding cutter and each of the cutters thereby engages only a small portion of the face of the bore. Upon rotation of the drill the cutters form a series of annular steps which individually are relatively narrow whereby the spoil is consequently fine and, according to the invention, is discharged downwardly and ahead of the drill.

The cutting head 3 includes the guide 8 which comprises a tapered open cylinder having the cross-member 9 fixed within the larger upper end thereof. Cross-member 9 is suitably fixed on the lower end of shaft 4 to secure the guide 8 in alignment with the shaft and with the smaller end of the guide disposed to enter the initial bore 10 to lead the head.

The bore 10 is shown in the drawings as extending from the upper chamber 11 of a mine to the tunnel 12 located therebelow. Chamber 11 should be large enough for the operator of the motor and the manipulation of the drill.

Initially, shaft 4 of cutting head 3 is connected directly to output-shaft 5 of motor 2 and thereafter the drive extensions 13 are connected between shafts 4 and 5 as the cutting head moves downwardly. The support ring 14 which fits within the enlarged bore 15 is provided with a center bearing 16 through which an extension 13 is passed to stabilie the extension and prevent "whipping."

The individual cutters 7 form a series of annular steps which, as described, comprise the conical face 17 of the enlarged bore 15. In practice, much of the spoil falls between cutting head 3 and the face 17 referred to, and the remaining spoil slides downwardly on the flight 6 of cutting head 3 toward the open upper end of the guide 8 and into the top of the guide or through the portions cut-away as at 18 at the upper end of the guide. Spoil passing through the portions 18 falls between the guide 8 and the smaller bore 10. With the spoil sufficiently fine, the spoil falls through the smaller bore 10 into tunnel 12 from whence it may be conveniently removed as by the truck 19 or otherwise. The pitch of flight 6 respecting the direction of rotation of the drill is preferably to be downward so that the spoil is given positive movement toward guide 8.

However, it has been found that the cutting head may, in fact, have a reverse pitch and that in any case the spoil will still fall toward and through the guide. That is, the cutting head 3 may be identical to that of the copending application referred to, and, as such, may be of the type normally employed to discharge the spoil in the direction of the operator. Accordingly, the cutting head 3 may be provided with the usual lead screw or the like, not shown, and upon replacing the guide 8 therefor, the cutting head is adaptable for operation as described above and in accordance with the present invention.

Various modes of carrying out the invention are contemplated as within the scope of the following claims particularly pointing out and distinctly claiming the subject matter which is regarded as the invention.

I claim:

1. A drill for enlarging an existing vertical bore which is accessible at both upper and lower ends, which drill comprises a motor, a drill head having one end adapted to be drivingly connected to said motor, a tapered open cylindrical guide fixed to the other end of said drill head in the place of a lead screw and of a size to fit the bore to be enlarged, said drill head having a series of cutters arranged with respect to the axis of rotation of the drill to cut a series of annular steps from the existing bore at the upper end of the guide and of sizes increasing to that of the enlarged bore, said guide being hollow and having openings at both ends to allow the spoil which falls from cutting said steps to pass through the guide and through the remaining portion of the existing bore for removal at the lower end of the bore.

2. In combination with a drill head having one end adapted to be drivingly connected to a motor, a tapered open cylindrical guide for use with said drill head in enlarging a vertical bore and adapted to be fixed to the other end of said drill head as in the place of a lead screw and of a size to fit said bore to be followed by the drill head, said guide being hollow and being open at both ends to allow the spoil to fall through the guide and through the remaining portion of the bore for removal therefrom, said guide also having at least one cut-away portion at the upper end thereof to allow spoil to fall between the guide and the bore.

3. A drill head for enlarging an open vertical bore comprising a series of cutters arranged with respect to the axis of rotation of the drill to cut a series of annular steps from the existing bore and of sizes increasing to that of the enlarged bore, and a tapered cylindrical guide open at both ends and fixed to the end of said drill head in the place of a lead screw and of a size to fit the bore to be enlarged, said guide being hollow and having at least one cut-away portion at the upper end thereof, the guide allowing spoil to fall either through the guide or between the guide and the bore and hence through the remaining portion of the existing bore for removal at the lower end of the bore.

4. A drill for enlarging an existing vertical bore, comprising drive means, connector means secured at one end to said drive means and adapted to extend downwardly into said bore, a drill head mounted adjacent the lower end portion of said connector means and having a series of cutters arranged with respect to the axis of rotation of the drill to cut a series of annular steps from the existing bore, a cross member fixed on the lower end of said connector means, and a tapered hollow cylindrical guide open at both ends to permit spoil to fall from said drill head through the guide and hence through the remaining portion of the existing bore for removal at the lower end of the bore, said guide being secured at its upper end to said cross member.

5. A drill for enlarging an existing vertical bore, comprising drive means, connector means secured at one end to said drive means and adapted to extend downwardly into said bore, a drill head mounted adjacent the lower end portion of said connector means and having a series of cutters arranged with respect to the axis of rotation of the drill to cut a series of annular steps from the existing bore, a cross member fixed on the lower end of said connector means, a tapered hollow cylindrical guide open at both ends to permit spoil to fall from said drill head through the guide and hence through the remaining portion of the existing bore for removal at the lower end of the bore, said guide being secured at its upper end to said cross member, and support means adapted to be disposed within the enlarged portion of the bore and engaging said connector means to stabilize the latter.

References Cited in the file of this patent
UNITED STATES PATENTS

| | | |
|---|---|---|
| 1,406,348 | Corrigan | Feb. 14, 1922 |
| 1,859,717 | Rutrle | May 24, 1932 |
| 2,281,614 | Ogran | May 5, 1942 |